(12) United States Patent
Tanimoto

(10) Patent No.: US 6,984,252 B2
(45) Date of Patent: Jan. 10, 2006

(54) METHOD OF AND APPARATUS FOR COLLECTING DUST, DEVELOPMENT APPARATUS, AND IMAGE FORMATION APPARATUS

(75) Inventor: Yoshiyuki Tanimoto, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 15 days.

(21) Appl. No.: 10/459,491

(22) Filed: Jun. 12, 2003

(65) Prior Publication Data

US 2004/0000230 A1 Jan. 1, 2004

(30) Foreign Application Priority Data

Jun. 17, 2002 (JP) .............................. 2002-175147
Feb. 21, 2003 (JP) .............................. 2003-043726
May 8, 2003 (JP) .............................. 2003-130574

(51) Int. Cl.
*G03G 15/08* (2006.01)
*G03G 21/00* (2006.01)
*G03G 21/10* (2006.01)

(52) U.S. Cl. .......................... 55/385.1; 55/429; 55/323; 55/329; 55/392; 55/DIG. 34; 96/111; 96/117; 96/399; 96/413; 96/417; 96/421; 355/316; 355/205; 355/206; 355/207; 95/1; 95/19; 73/28.01; 73/28.03; 73/31.03; 73/31.04; 116/266; 116/DIG. 25

(58) Field of Classification Search .............. 55/385.1, 55/429, 323, 329, 392, DIG. 34; 96/111, 96/117, 399, 413, 417, 421; 355/316, 205–207; 95/1, 19; 73/31.04, 28.01; 116/266, DIG. 25

See application file for complete search history.

(56) References Cited

U.S. PATENT DOCUMENTS

| 4,533,238 A | * | 8/1985 | Miyazaki ...................... 355/68 |
| 4,782,369 A | | 11/1988 | Yasuda et al. |
| 4,785,328 A | | 11/1988 | Tanimoto et al. |

FOREIGN PATENT DOCUMENTS

| JP | 8-146768 | 6/1996 |
| JP | 9-114225 | 5/1997 |
| JP | 10-97132 | 4/1998 |

(Continued)

OTHER PUBLICATIONS

U.S. Appl. No. 10/756,253, filed Jan. 14, 2004, Yoshiki.

*Primary Examiner*—Duane Smith
*Assistant Examiner*—Minh-Chau T. Pham
(74) *Attorney, Agent, or Firm*—Oblon, Spivak, McClelland, Maier & Neustadt, P.C.

(57) ABSTRACT

A dust collection apparatus includes a container and a suction pump that sucks dust and transports it into the container. A filter is provided on a side surface of the container. This filter passes air but prevents passage of the dust in the container. A pressure detector detects an internal pressure of the container. The internal pressure of the container fluctuates due to a variation in an effective area of the filter for allowing the air to pass according to the dust collected and accumulated in the container. A dust accumulating quantity calculator which determines a quantity of the dust in the container based on the pressure detected.

16 Claims, 10 Drawing Sheets

U.S. PATENT DOCUMENTS 5,124,759 A * 6/1992 Fukuchi et al. ............... 399/22
5,131,079 A    7/1992 Miyawaki et al.
5,225,871 A    7/1993 Tanimoto
5,400,127 A    3/1995 Arai et al.
5,453,813 A * 9/1995 Arnold et al. ................ 355/41
5,861,053 A * 1/1999 Noritake et al. .............. 96/111
6,093,228 A * 7/2000 Wang ...................... 55/385.1

FOREIGN PATENT DOCUMENTS

| | | |
|---|---|---|
| JP | 11-282322 | 10/1999 |
| JP | 2000-293079 | 10/2000 |

* cited by examiner

FIG.5
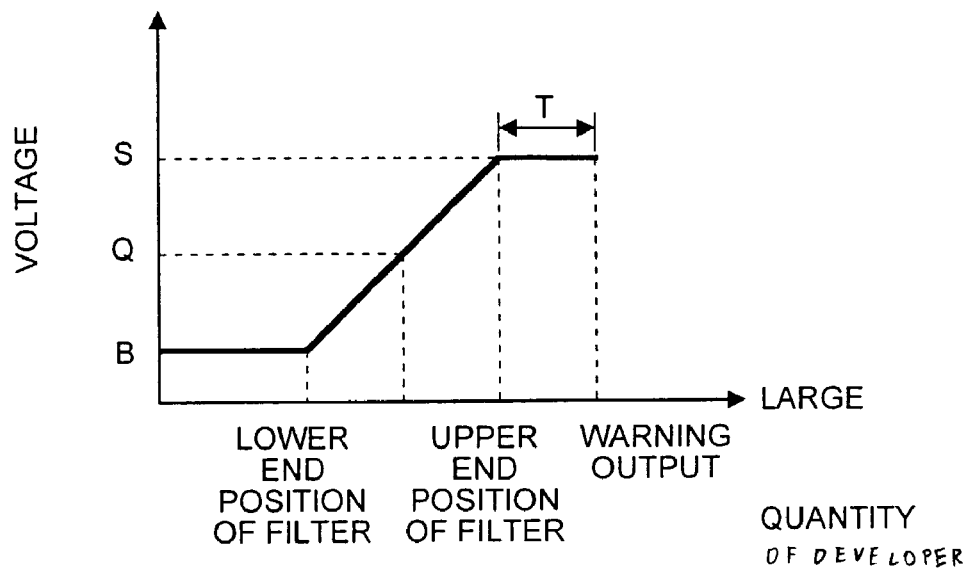
FIG.6A  FIG.6B  FIG.6C  FIG.6D
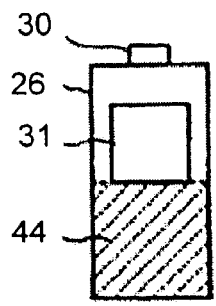 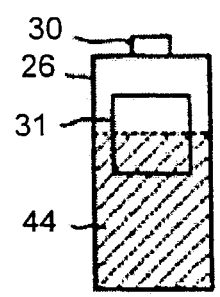 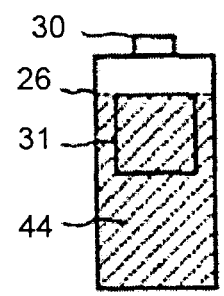 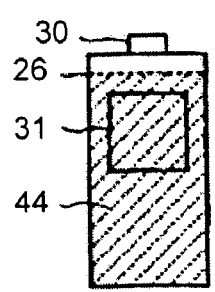

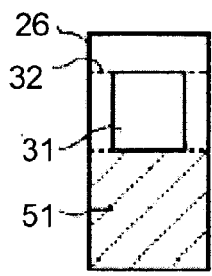 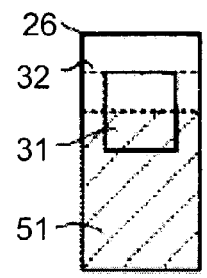 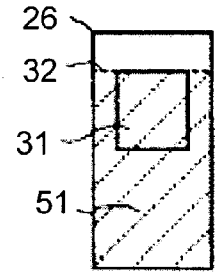 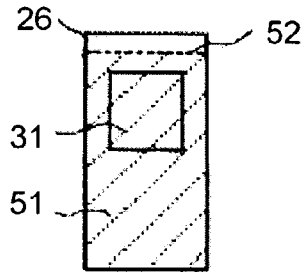
FIG.11A  FIG.11B  FIG.11C  FIG.11D
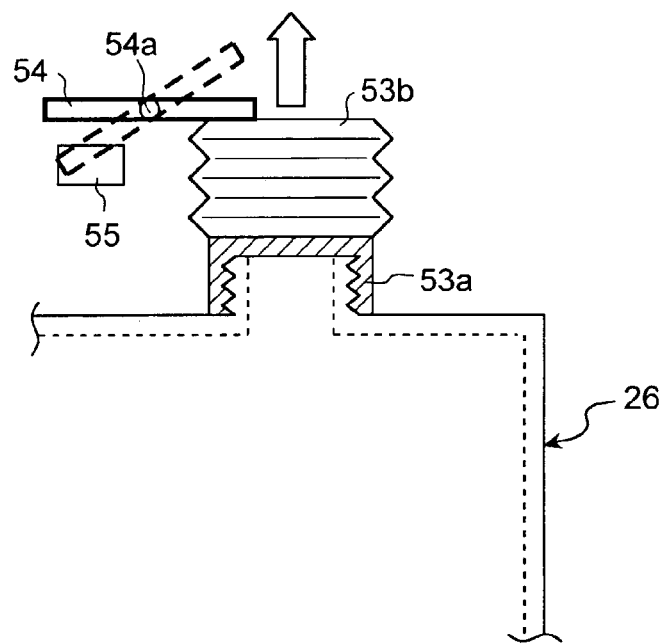
FIG.12

METHOD OF AND APPARATUS FOR COLLECTING DUST, DEVELOPMENT APPARATUS, AND IMAGE FORMATION APPARATUS

BACKGROUND OF THE INVENTION

1) Field of the Invention

The present invention relates to a technology for accurately detecting quantity of waste developer collected in a container.

2) Description of the Related Art

Japanese Patent Application Laid-Open No. 11-282322, for example, discloses collection of waste developer in an electro photographic type image formation apparatus such as a copying machine or a printer. After a latent image formed on the photoreceptor is developed by developer and before the image is transferred onto a paper, extra developer (hereinafter, "waste developer") remaining on the photoreceptor is scrapped using a cleaning apparatus and collected into a container (hereinafter, "collection container"). When the waste developer in the collection container exceeds a certain quantity, a warning that the collection container is full is displayed on an operation display section. When such a warning is displayed, a service person or someone around the device throws away the waste developer in the collection container and thus empties the collection container.

Thus, it is required to decide whether the waste developer in the collection container has exceeded the certain quantity. Japanese Patent Application Laid-Open No. 9-114225, for example, discloses how to detect the quantity of the waste developer in the collection container. This publication discloses two methods; a weight detection method and a time management method. In the weight detection method, a spring takes the weight of the collection container, a sensor detects amount of compression of the spring, and when the amount of compression exceeds a certain level, it is decided that the collection container is full with the waste developer. In the time management method, a controller counts the total operating time of a driving device that drives an arrangement for conveying the waste developer to the collection container, and when the operating time of the driving device exceeds a certain value, it is decided that the collection container is full with the waste developer.

However, the methods disclosed in the Japanese Patent Application Laid-Open No. 9-114225 have, for example, following problems. There is a great variation in the compression of the spring, and therefore, with the superposition detecting method it is difficult to detect the quantity of the waste developer accurately. The spring that takes the weight of the collection container makes the attachment and detachment of the collection container difficult. Moreover, the quantity of the waste developer produced differs according to types and sizes of the paper, the contents to be printed, and even the environmental conditions, therefore, the time management method, in which the quantity of the waste developer is estimated based on only the operating time, does not give accurate results.

SUMMARY OF THE INVENTION

It is an object of the present invention to solve at least the problems in the conventional technology.

A dust collection apparatus according to one aspect of the present invention includes a container and a suction pump that sucks dust and transports it into the container. A filter is provided on a side surface of the container. This filter passes air but prevents passage of the dust in the container. A pressure detector detects an internal pressure of the container. The internal pressure of the container fluctuates due to a variation in an effective area of the filter for allowing the air to pass according to the dust collected and accumulated in the container. A dust accumulating quantity calculator which determines a quantity of the dust in the container based on the pressure detected.

The development apparatus and the image formation apparatus according to other aspects of the present invention collect the dust using the dust collection apparatus according to the present invention.

The method of collecting dust according to still another aspect of the present invention includes sucking and collecting the dust into a container, the container having a side surface on which a filter with a structure that allows to pass air but prevent passage of the dust in the container is provided; detecting internal pressure of the container, wherein the internal pressure of the container fluctuates due to a variation in an effective area of the filter for allowing the air to pass according to the dust collected and accumulated in the container; and judging a quantity of the dust in the container based on the pressure detected.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 5 is a graph of voltage of a voltage sensor against quantity of waste developer collected;

FIGS. 6A to 6D are schematic illustrations of quantity of the waste developer collected and accumulated in the collection container according to the first embodiment;

FIGS. 11A to 11D are schematic illustrations of quantity of the waste developer collected and accumulated in the collection container according to the second embodiment;

FIG. 12 is a cross-section of a pressure detector according to a third embodiment of the present invention.

DETAILED DESCRIPTION

Exemplary embodiments of a method of and an apparatus for collecting dust, a development apparatus, and an image formation apparatus of the present invention are explained in detail below while referring to the accompanying drawings.

Figure 1:
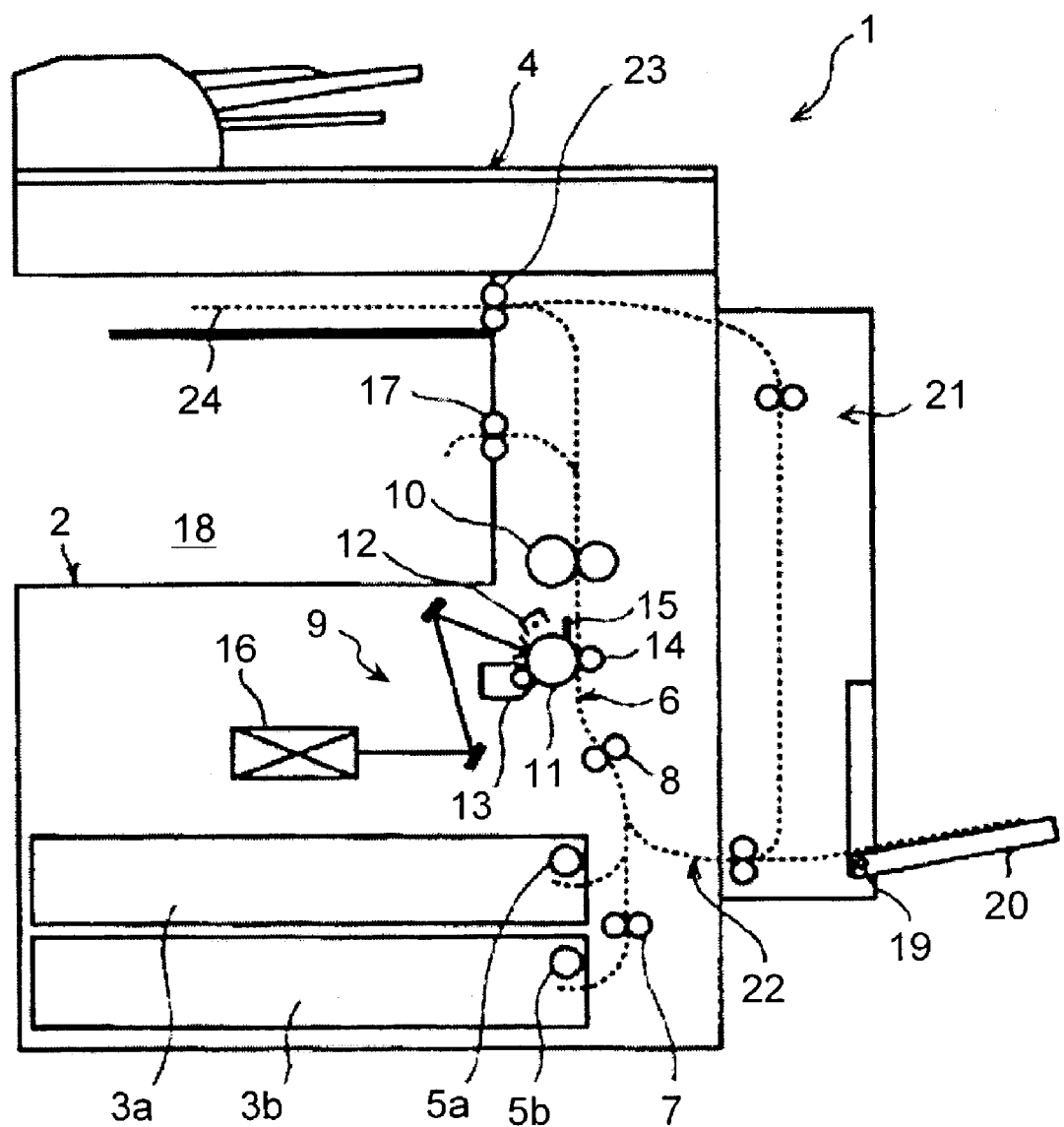
FIG. 1 is an illustration of an image formation apparatus according to one embodiment of the present invention.

FIG. 1 is an illustration of an image formation apparatus according to one embodiment of the present invention. As shown in FIG. 1, a lower portion of an apparatus main body 2 of the image formation apparatus 1 has two-tiered paper feed cassettes 3a, 3b which house a bunch of papers and an upper portion of the apparatus main body 2 has a reading unit 4.

The paper feed cassettes 3a, 3b have paper feed rollers 5a and 5b that feed the paper placed in the paper feed cassettes 3a, 3b, one by one. A vicinity of a downstream side of the paper feed rollers 5a, 5b is formed with an interfluent vertical conveying path 6. Conveying rollers 7, 8, an image formation section 9, and a fixing section 10 are provided on the vertical conveying path 6. The image formation section 9 has a photoreceptor 11, an electrifying charger 12 arranged on a periphery of the photoreceptor 11, a development apparatus 13, a transfer section 14, a cleaning unit 15, and a laser light source, a polygon mirror or the like. The image formation section 9 further has a writing unit 16 that emits a laser beam onto the photoreceptor 11 so as to write an image thereon.

A downstream end of the vertical conveying path 6 has a paper discharge roller 17 that conveys a recording paper sheet on which the image is formed to a paper discharge section 18. An outside of the vertical conveying path 6 has a manual feed tray 20 which can be opened or closed with a spindle 19 as a fulcrum to a rotating direction. A side surface of the apparatus main body 2 has a paper feed port from which paper sheets are manually fed in a vicinity of an upper portion of the spindle 19, and a common conveying path 22 which is commonly used for a dual side printing unit 21 interflows with the vertical conveying path 6 at the upstream side of the conveying roller 8. When the manual feed tray 20 is opened horizontally, the paper sheets can be manually fed, and the paper set on the manual feed tray 20 are conveyed from the common conveying path 22 to the vertical conveying path 6.

The paper, which are fed from the paper feed units 3a, 3b or the manual feed tray 20, are conveyed to the image formation section 9. In the image formation section 9, the development apparatus 13 develops an electrostatic latent image written and formed on the photoreceptor 11 by the writing unit 16, and the transfer section 14 transfers the developed image onto the recording paper sheet. The fixing section 10 heats and applies pressure to the recording paper sheet onto which the image is transferred so as to fix the image. The paper discharge roller 17 discharges the recording paper sheet to which the image is fixed onto the paper discharge section 18. The dual side printing unit 21 is provided to the outside of the apparatus main body 2. When the image is formed on dual sides of the recording paper sheet, the recording paper sheet whose one side is formed with the image is sent to a switchback path 24 by a conveying roller 23 provided on the upper portion of the apparatus main body 2 and is again conveyed from the switchback path 24 via the dual side printing unit 21 to the vertical conveying path 6.

Figure 2:
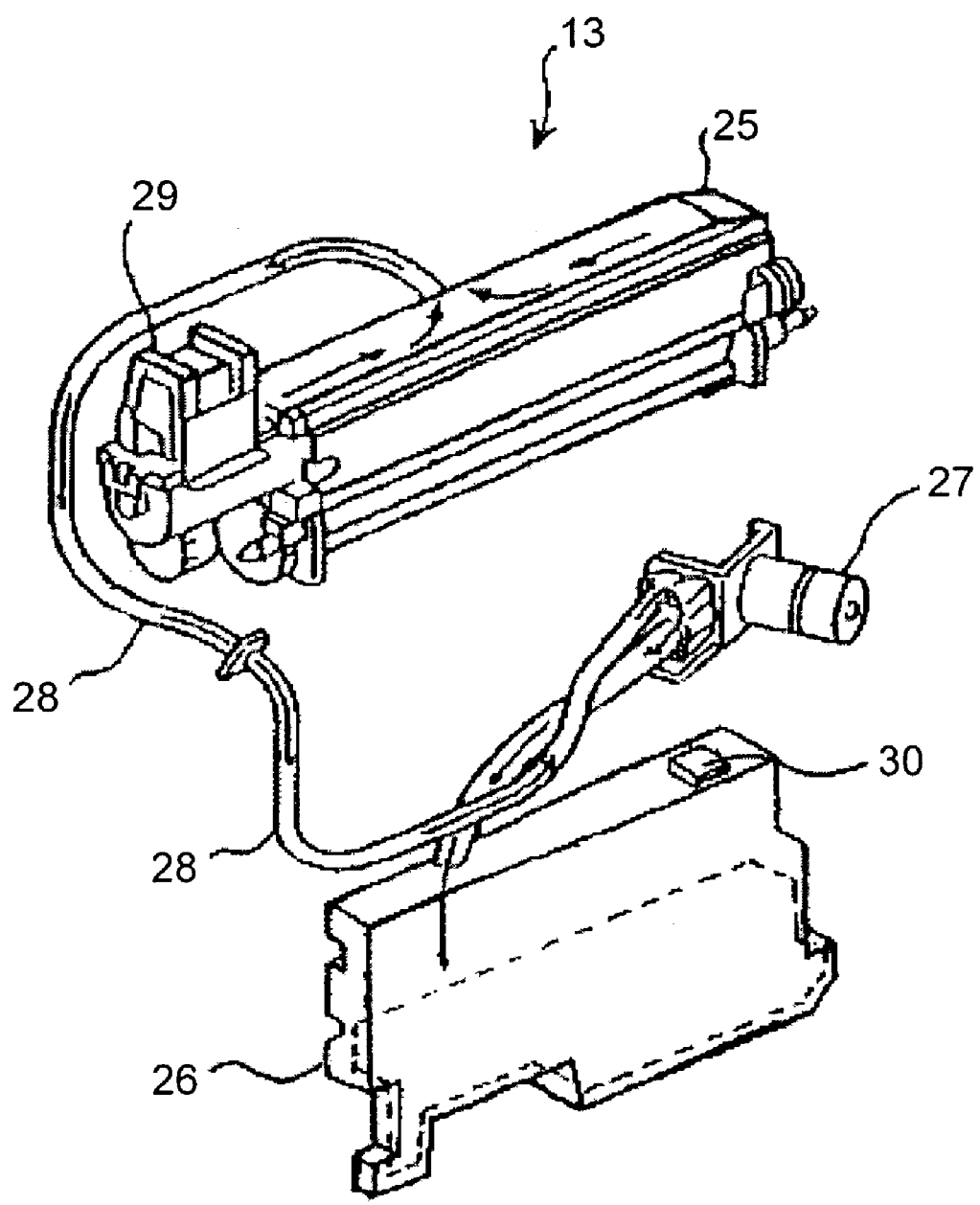
FIG. 2 is a perspective view of a development apparatus according to a first embodiment of the present invention.

The development apparatus 13 of the image formation apparatus 1, as shown in FIG. 2, has a development unit 25, a collection container 26, and a suction pump 27 of, for example, diaphragm type. An air inlet side of the suction pump 27 is connected with the development unit 25 by a suction hose 28, an exhaust side of the suction pump 27 is connected with the collection container 26 by the suction hose 28. The development unit 25 houses developer, whose particle diameters are small in order to improve quality of an image to be formed. Since such developer with small particle diameter easily scatters when a development motor 29 of the development unit 25 is driven, in order to prevent the scattering, while the development motor 29 is being driven, air in the development unit 25 is sucked by the suction pump 27 so that internal pressure of the development unit 25 is forcibly lowered. When the suction pump 27 sucks the air in the development unit 25, it sucks also a slight quantity of the development with small particle diameter in the development unit 15. The sucked developer is collected as waste developer into the collection container 26.

The collection container 26 has a pressure sensor 30 on its upper portion as a pressure detector that detects internal pressure of the collection container 26. As shown in a side view of FIG. 3, a filter 31 is provided on the surface of the collection container 26. The filter 31 allows air to pass therethrough but prevents the developer from passing therethrough, and its upper end comes to the same position as a near end line 32 of the collection container 26.

As the pressure sensor 30, a diffusion type semiconductor pressure sensor, for example, is used here. The diffusion type semiconductor pressure sensor utilizes a principle of a piezoresistance effect in which resistance changes due to application of the pressure, and it has a constitution such that diffusion resistance (sensor chip) is formed on four places of a thin diaphragm made of silicon. When pressure is applied to upper portions of the sensor chips and they are deflected, compressive stress acts on a central upper side of the diaphragm and tensile stress acts on a central lower side, so that the resistance of the sensor chips changes according to the strength of the stress. Consequently, a delicate change in the pressure can be detected by detection the resistance. In the first embodiment, the diffusion type semiconductor pressure sensor is preferably used as the pressure sensor 30, but it is not always limited to this example. The pressure sensor 30 is arranged on an upper surface of the collection container 26 as shown in FIG. 2. The pressure sensor 30 may be arranged on any position as long as when the collected waste developer stays in the collection container 26, it reaches the near end line 32 of the filter 31 shown in FIG. 3 so as to be capable of detecting rise in the internal pressure of the collection container 26. The providing position is not, consequently, limited to the upper surface of the collection container 26, and the pressure sensor 30 may be naturally provided to an upper side surface of the collection container 26.

Figure 3:
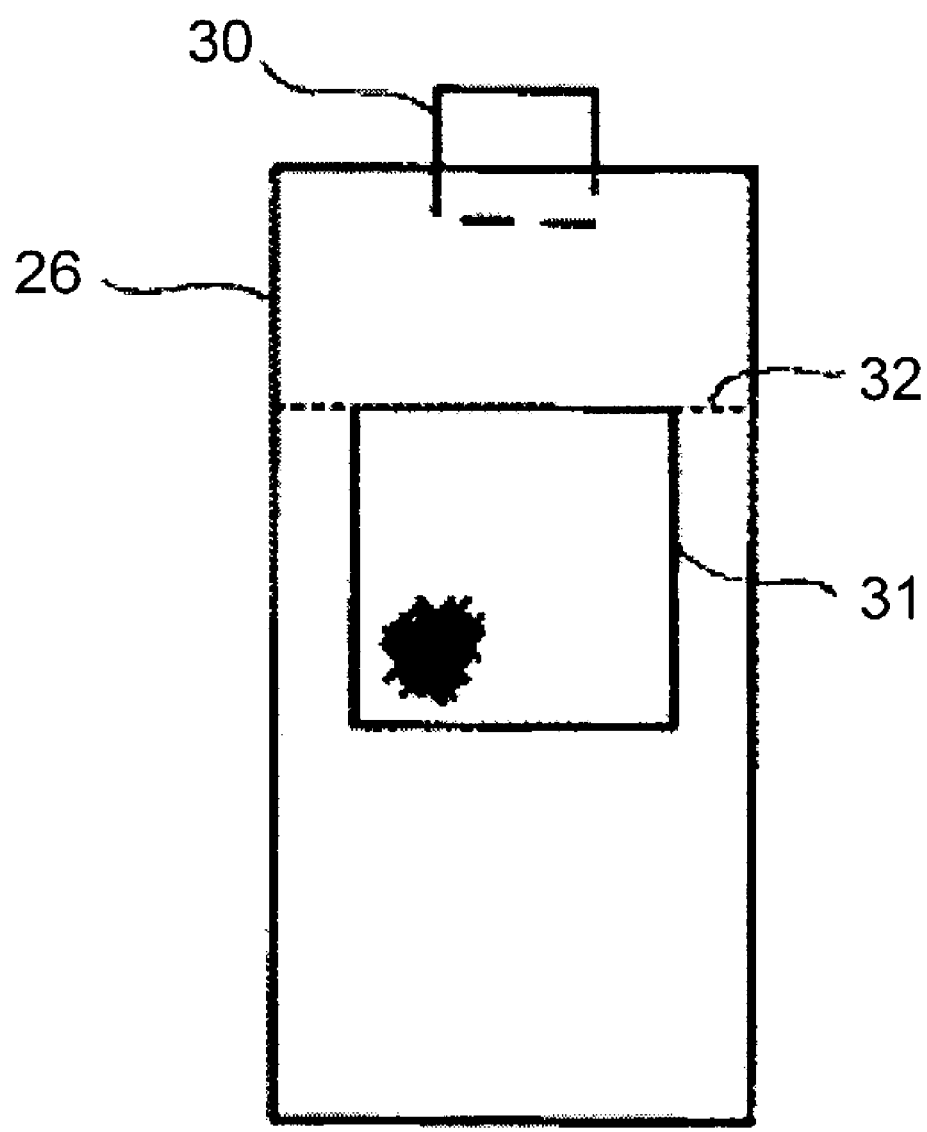
FIG. 3 is a side view of a filter of a collection container illustrated in FIG. 2.

As the filter 31, a tetrafluoroethylene resin porous film (for example, "Microtex" (Product name) made by Nitto Denko Corporation) is used here, and since the porous film has micropore (0.1 $\mu$m to 30 $\mu$m), the porous film can prevent discharge of the minute waste developer while it maintains sufficient permeability. A material of the filter is not necessarily limited to this example. It is desirable to arrange the filter 31 on a predetermined position (height) of the side surface of the collection container 26 except for its upper surface or bottom surface as shown in FIGS. 2 and 3. This is because a position at which the internal pressure changes, namely, the near end line 32 is determined by the position of the filter 31 and a staying condition of the waste developer. At least the position (upper end position) of the filter, a length of the filter (length from the upper end to the lower end), or the like should be, consequently, determined so that the suitable near end line 32 is set according to a capacity of the collection container to be used, a use quantity of the developer, and the like.

Figure 4:
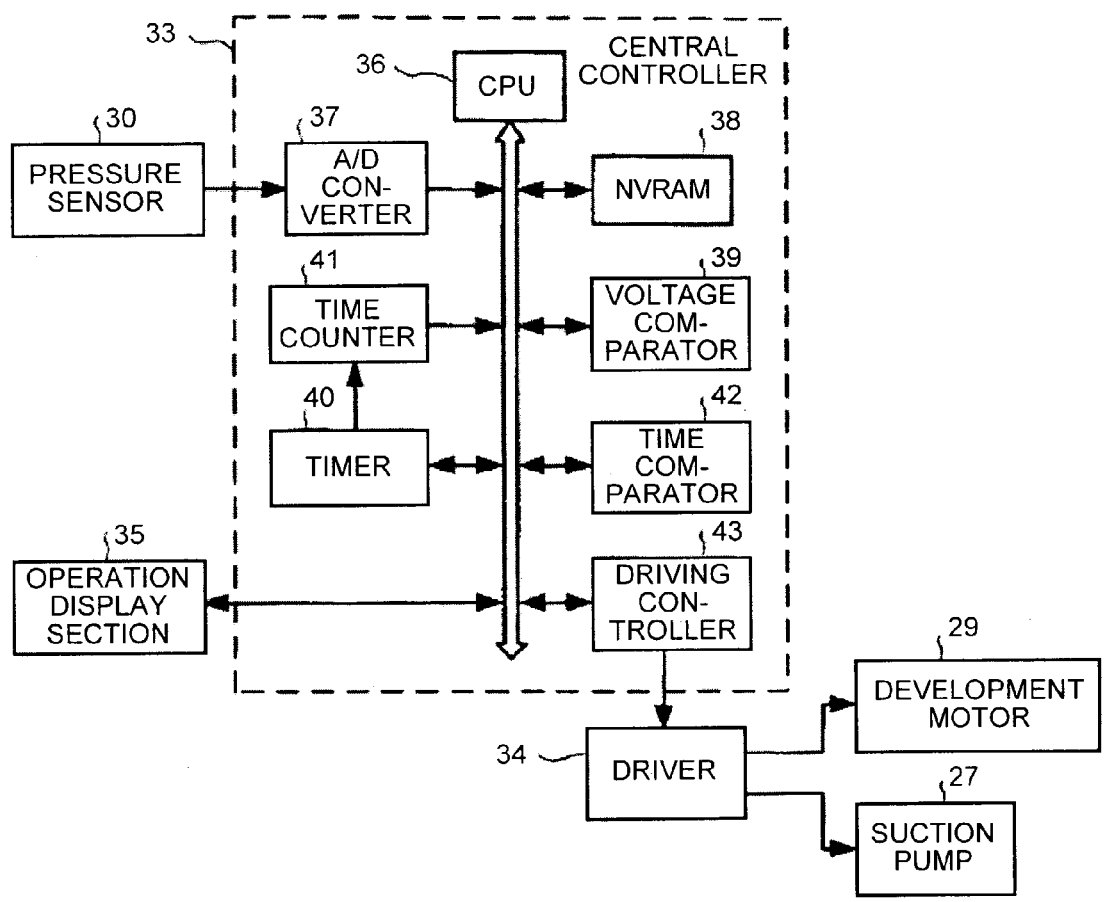
FIG. 4 is a block diagram of a central processor and its peripheral constitution according to the first embodiment.

The pressure sensor 30 for the collection container 26 is, as shown in a block diagram of FIG. 4, connected with an A/D input port of a central controller 33, and the suction pump 27 and the development motor 29 are connected with an output port of the central controller 33 via a driver 34. The central controller 33 manages a whole operation of the image formation apparatus 1 based on various set instructions from an operation display section 34, and displays an operating state on an operation display section 35. The central controller 33 has a CPU 36, an A/D converter 37 which converts an output voltage from the pressure sensor 30 into a digital signal, an NVRAM 38, a voltage comparator 39, a timer 40, a time counter 41, a time comparator 42, and a driving controller 43.

When the latent image formed on the photoreceptor 11 is visualized by the developer housed in the development unit 25 of the development apparatus 13 and is transferred onto the recording paper sheet in the image formation apparatus 1, the CPU 36 of the central controller 33 interlocks with the development motor 29 so as to drive the suction pump 27. When the suction pump 27 is driven, air in the development unit 25 is sucked so that the inside of the development unit 25 has negative pressure, thereby preventing the developer with small particle diameter from scattering. At this time, a slight quantity of the developer scattering in the development unit 25 is simultaneously sucked so as to be collected as the waste developer into the collection container 26. The air sucked by the suction pump 27 passes through the entire surface of the filter 31 and is released into the outside until the waste developer is collected into the collection container 26 and the top surface of the waste developer accumulated in the collection container 26 reaches the lower end of the filter 31. The internal pressure of the collection container 26 detected by the pressure sensor 30, consequently, becomes approximately constant due to resistance of the filter 31 to the air, and the output voltage from the pressure sensor 30, as shown in FIG. 5, has an approximately constant value B.

The approximately constant output voltage B is output from the pressure sensor 30 to the central controller 33 until the quantity of the waste developer accumulated in the collection container 26 increases and, as shown in FIG. 6A, the top surface of the waste developer 44 reaches the lower end of the filter 31. When the waste developer is accumulated in the collection container 26 and, as shown in FIG. 6B, the top surface of the waste developer rises above the lower end of the filter 31, an area of the filter 31 for allowing the air to pass becomes gradually small, and the internal pressure of the collection container 26 detected by the pressure sensor 30 becomes gradually high, so that the output voltage form the pressure sensor 30, as shown in FIG. 5, exceeds an output voltage Q and becomes gradually higher. When an accumulated quantity of the waste developer collected in the collection container 26 increases and, as shown in FIG. 6C, the upper end of the accumulated waste developer reaches the upper end of the filter 31, the area of the filter 31 for allowing the air to pass extremely decreases, so that the output voltage from the pressure sensor 30 increases. When the upper end of the accumulated waste developer reaches the near end line 32 and the filter 31 is completely clogged with the waste developer, as shown in FIG. 5, the output voltage S is output from the pressure sensor 30 to the central controller 33. When the upper end of the accumulated waste developer reaches the upper end of the filter 31 and the filter 31 is completely clogged, the air in the collection container 26 does not flow to the outside, and thus a supply quantity of the air flowing from the suction pump 27 to the collection container 26 reduces so that a variation in the internal pressure of the collection container 26 becomes small.

Consequently, the NVRAM 38 of the central controller 33 prestores a minimum reference voltage B at which the air is allowed to pass through the entire surface of the filter 31 of the collection container 26, a reference voltage S corresponding to the position of the near end line 32 of the collection container 26, and reference time T for driving the development motor 29 and the suction pump 27 required until the top surface of the waste developer accumulated in the collection container 26 reaches the near end line 32 and then reaches an upper limit value as shown in FIG. 6D.

When the image is formed by the image formation apparatus 1, the voltage comparator 39 of the central controller 33 monitors the voltage output from the pressure sensor 30 of the collection container 26 with certain time intervals, for example, every one second, and compares the voltage with the reference voltage S stored in the NVRAM 38. When the output voltage from the pressure sensor 30 reaches the reference voltage S, a near end flag is raised in the NVRAM 38. When the near end flag is raised in the NVRAM 38, the CPU 36 outputs a signal which shows that the collection container 26 is at the near end to the operation display section 35 so as to instruct the operation display section 35 to display that the collection container 26 is at the near end. In such a manner, the CPU 36 informs a user that the collection container 26 approaches replacement time.

After the CPU 36 outputs a near end signal to the operation display section 35, the CPU 36 drives the time counter 41 every time when the image is formed by the image formation apparatus 1, and it instructs the time counter 41 to integrate driving time of the development motor 29 and stores cumulative time of the driving time of the development motor 29 after the near end flag is raised in the NVRAM 38 into the NVRAM 38. Since the cumulative time of the driving time of the development motor 29 is stored in the NVRAM 38 in such a manner, even if the power of the image formation apparatus 1 is turned off, the cumulative time can be saved. When the image is formed by the image formation apparatus 1, the time comparator 42 compares the cumulative time of the driving time of the development motor 29 successively stored in the NVRAM 38 with the reference time T prestored in the NVRAM 38. When the cumulative time of the driving time of the development motor 29 after the near end reaches the reference time T, a collection container replacement flag is raised in the NVRAM 38. When the collection container replacement flag is raised in the NVRAM 38, the CPU 36 stops the image forming operation in the image formation apparatus 1, and instructs the operation display section 35 to display an instruction that indicates that the collection container 26 is full and should be replaced.

A user or a service person who confirms the instruction on the operation display section 35 turns off the power of the image formation apparatus 1 and removes the collection container 26 filled with the waste developer so as to replace it with a new collection container 26. When the old collection container 26 is replaced with the new collection container 26 and the power of the image formation apparatus 1 is turned on, the CPU 36 of the central controller 33 instructs the driving controller 43 to temporarily drive the suction pump 27. At this time, the voltage comparator 39 compares the output voltage from the pressure sensor 30 with the minimum reference voltage B stored in the NVRAM 38. When the output voltage from the pressure sensor 30 is within a certain range of the minimum reference voltage B, a judgment is made that the new collection container 26 is attached normally, and the near end flag raised in the NVRAM 38 is cleared. When the near end flag is cleared, the collection container replacement flag is also cleared, and a prohibition of the image forming operation in the image formation apparatus 1 is lifted. When the output voltage from the pressure sensor 30 is in not more than the certain range of the minimum reference voltage B, the judgment is made that the collection container 26 is not normally attached or the pressure sensor 30 is abnormal. When such judgment is made, the CPU 36 instructs the operation display section 35 to display a message for urging a check on the state of the collection container 26. When the user or the service person checks on the display and reattaches the collection container 26 or attaches the new collection container 26, the attachment state is checked as mentioned above, and when it is attached properly, the prohibition of the image forming operation in the image formation apparatus 1 is lifted.

According to the first embodiment, a quantity of the dust (i.e., the waste developer) collected is detected accurately and the best time for replacement of the collection container can be informed to the concerned person. Moreover, the image forming operation is not started if the collection container 26 is not attached properly. As a result, the developer does not scatter in the image formation apparatus 1.

The first embodiment explains that the waste developer from the development unit 25 is collected into the collection container 26, but the invention can be applied similarly to a collection container which collects waste developer which is resulted from a cleaning of the surface of the photoreceptor 11.

An image formation apparatus according to a second embodiment of the present invention will now be explained. The constitution of the image formation apparatus according to a second embodiment is quite similar to that of the first embodiment; so that detailed explanation of the constitution of the image formation apparatus according to a second embodiment will be omitted to avoid repetition of explanation. The characteristic feature of the second embodiment is the development apparatus 13. The same or corresponding portions as or to the portions of the constitution in the first embodiment are designated by the same reference numerals.

Figure 7:
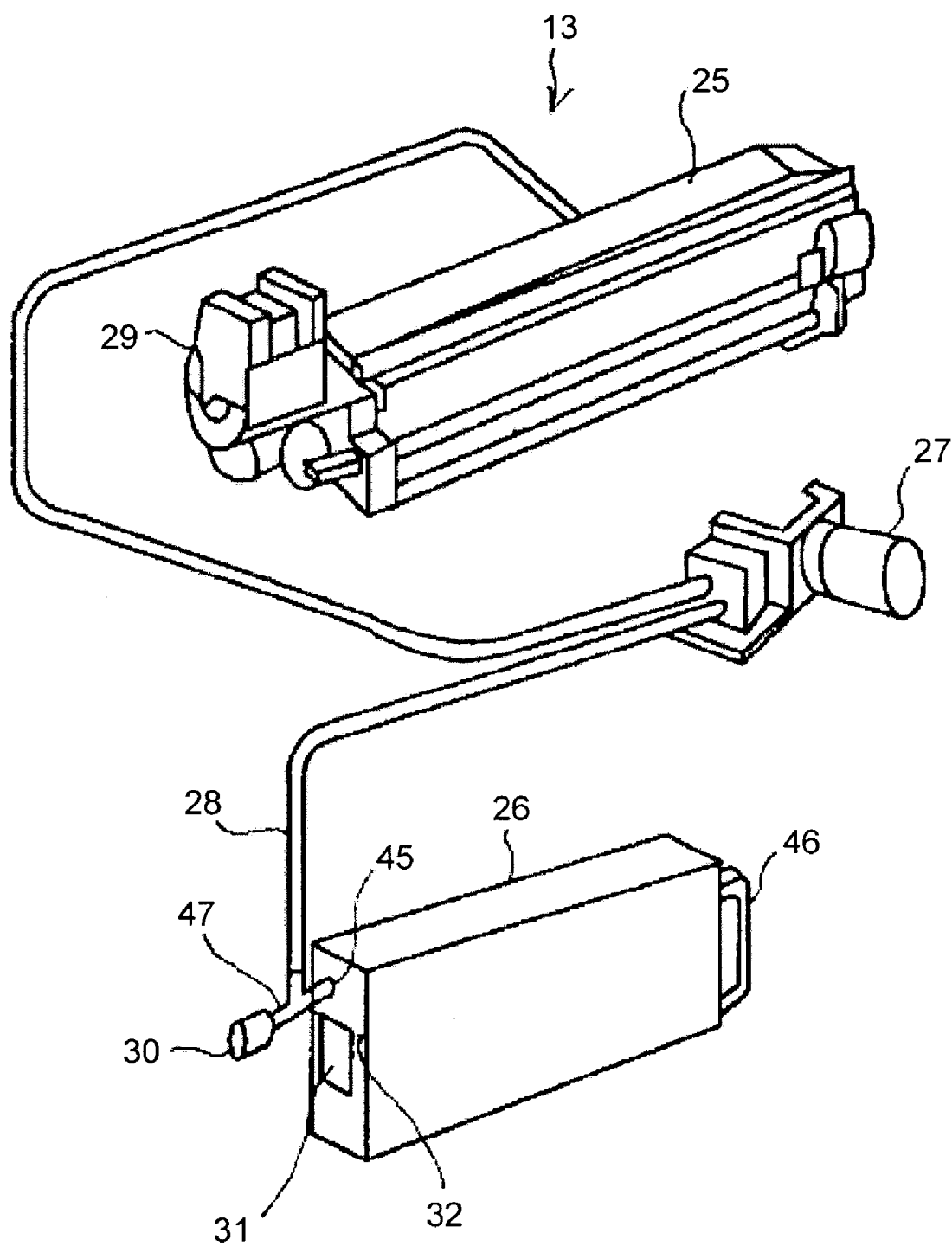
FIG. 7 is a perspective view of the development apparatus according to a second embodiment of the present invention.

The development apparatus 13 has, as shown in a perspective view of FIG. 7, the development unit 25, the collection container 26, and the suction pump 27. The suction pump 27 is, for example, of the diaphragm type. The air inlet side of the suction pump 27 is connected with the development unit 25, and the exhaust side of the suction pump 27 is connected with the collection container 26. The development unit 25 stores the developer with small particle diameter in order to improve the quality of an image to be formed. The developer with small particle diameter easily scatters when the development motor 29 of the development unit 25 is driven, and in order to prevent the scattering, while the development motor 29 is being driven, the air in the development unit 25 is sucked by the suction pump 27 so that the internal pressure of the development unit 25 is forcibly lowered. When the suction pump 27 sucks the air in the development unit 25, it sucks also the developer with small particle diameter in the development unit 25 slightly. The sucked developer is collected as the waste developer into the collection container 26.

Figure 8:
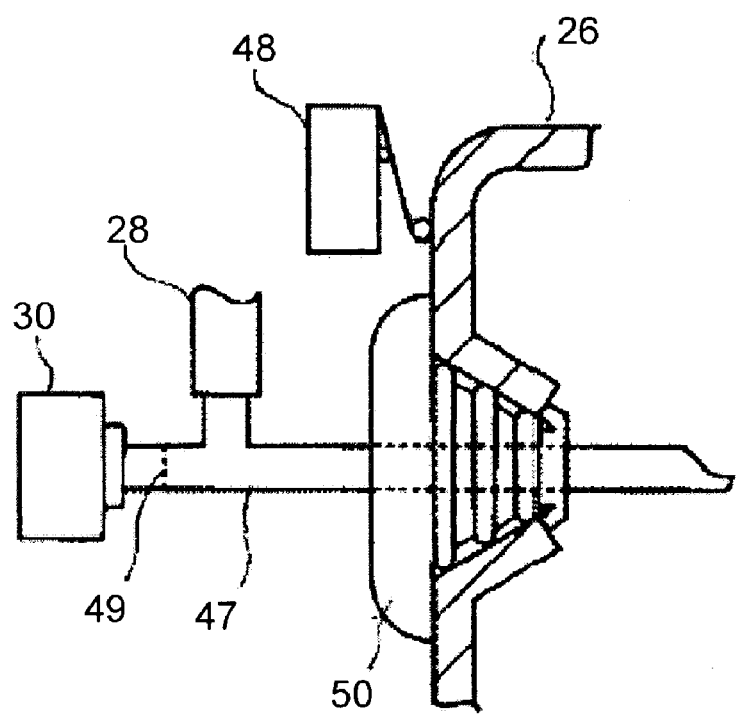
FIG. 8 is a structural diagram of a portion where the collection container and an exhaust pipe illustrated in FIG. 7 are linked.
Figure 9:
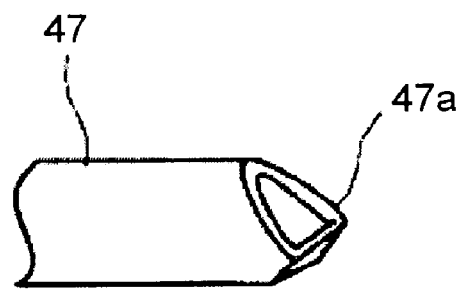
FIG. 9 is a structural diagram of a tip portion of the exhaust pipe illustrated in FIG. 8.

The collection container 26 has the filter 31 on its side surface, an opening 45 above the filter 31 which is connected with the suction pump 27, and a handle 46 on the other side surface. The filter 31 is formed so as to allow the air to pass but prevent the developer from passing, and its upper end comes to the same position as the near end line 32 of the collection container 26. The opening 45 is, as shown in a partial sectional view of FIG. 8, worked into a taper form, and one end of an exhaust pipe 47 is fitted into the opening 45 via a cap 50 made of an elastic body such as rubber without a gap. The exhaust pipe 47 has a T-joint connected with an exhaust port of the suction hose 28 connected with the exhaust side of the suction pump 27. The other end of the exhaust pipe 47 is connected with the pressure sensor 30 as the pressure detector via a filter 49. A tip portion 47a of the exhaust pipe 47 to be fed into the collection container 26 is, as shown in a partial detailed diagram of FIG. 9, worked so that its lower portion is extended. When the exhaust pipe 47 is attached to and detached from the collection container 26 in order to replace the collection container 26, consequently, the waste developer is prevented from dropping. An attachment portion of the collection container 26 is provided with a sensor which detects that the collection container 26 is attached securely, for example, a limit switch 48 which is brought into contact with the surface of the collection container 26 opposite to the surface provided with the handle 46 so as to be turned on.

As the pressure sensor 30 in the second embodiment, the diffusion type semiconductor pressure sensor which is used in the first embodiment is preferably used, but the pressure sensor 30 is not necessarily limited to this example, and as its mounting position, various positions can be considered.

As the filters 31, 49 in the second embodiment, the tetrafluoroethylene resin porous film (for example, "Microtex" (Product name) made by Nitto Denko Corporation) which is used in the first embodiment is preferably used, but the filters 31, 41 are not necessarily limited to this example, and as their mounting positions, various positions can be considered.

Figure 10:
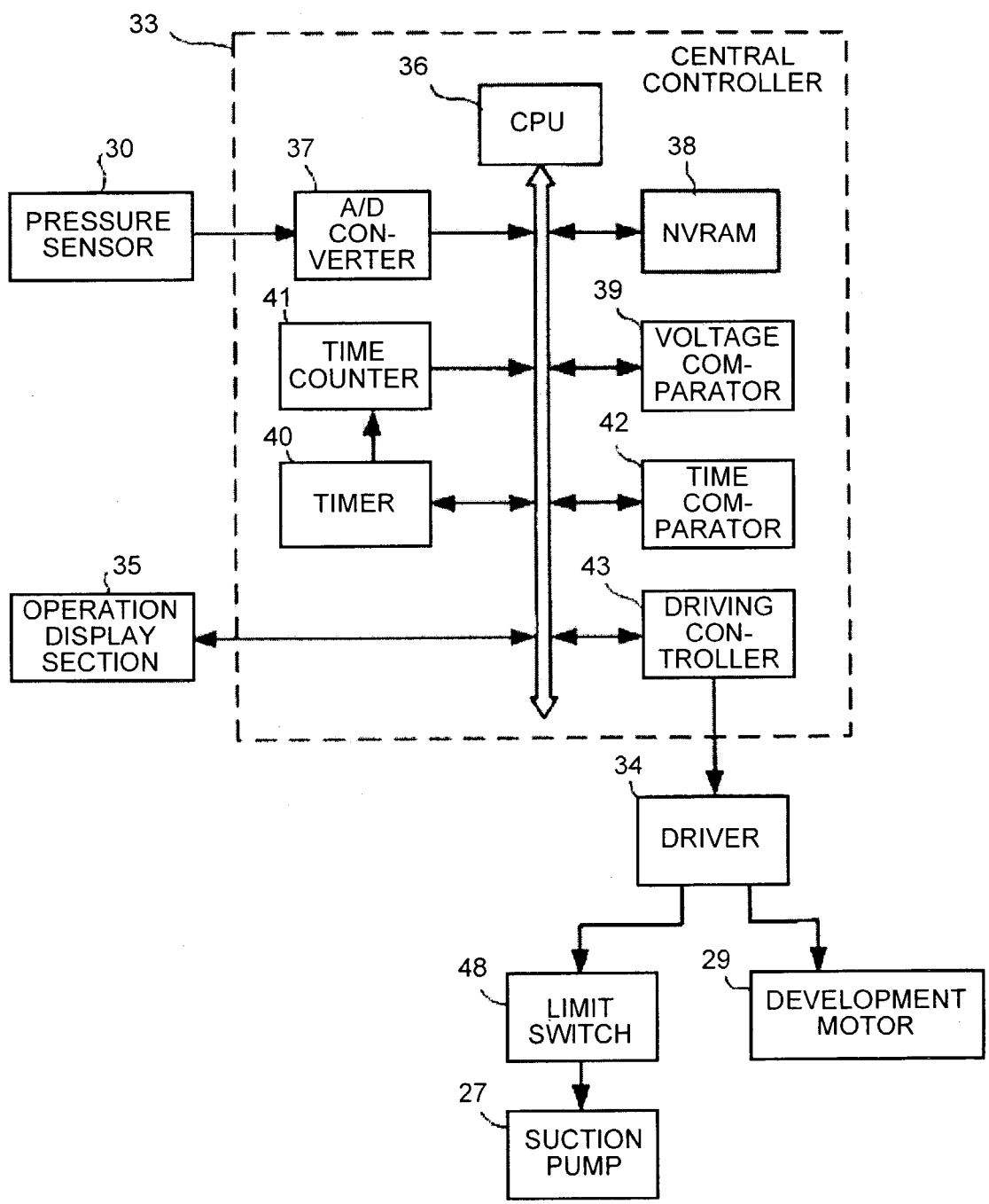
FIG. 10 is a block diagram of a central processor according to the second embodiment.

The pressure sensor 30 provided to the exhaust pipe 47 is, as shown in a block diagram of FIG. 10, connected with the A/D input port of the central controller 33, and the suction pump 27 and the development motor 29 are connected with the output port of the central controller 33 via the driver 34. The central controller 33 manages the whole operation of the image formation apparatus 1 based on various set instructions from the operation display section 35, and displays the operating state on the operation display section 35. The central controller 33 has the CPU 36, the A/D converter 37 which converts the output voltage from the pressure sensor 30 into a digital signal, the NVRAM 38, the voltage comparator 39, the timer 40, the time counter 41, the time comparator 42, and the driving controller 43.

When the latent image formed on the photoreceptor 11 is visualized by the developer housed in the development unit 25 of the development apparatus 13 and is transferred onto the recording paper sheet in the image formation apparatus 1, the CPU 36 of the central controller 33 interlocks with the development motor 29 so as to drive the suction pump 27. At this time, when the collection container 26 of the development apparatus 13 is attached to the attachment portion securely and the limit switch 48 is turned on a driving voltage is applied from the driver 34 to the suction pump 27 so as to drive the suction pump. When the suction pump 27 is driven, the air in the development unit 25 is sucked so that the inside of the development unit 25 has negative pressure, and the developer with small particle diameter can be prevented from scattering. At this time, a slight quantity of the developer scattering in the development unit 25 is simultaneously sucked so as to be collected as the waste developer into the collection container 26. When the waste developer is collected into the collection container 26, the air sucked by the suction pump 27 passes through the entire surface of the filter 31 and is released to the outside until the top surface of the waste developer collected and accumulated in the collection container 26 reaches the lower end of the filter 31. The internal pressure of the collection container 26 detected by the pressure sensor 30, consequently, becomes approximately constant due to the resistance of the filter 31 to the air, and the output voltage from the pressure sensor 30 obtains an approximately constant value B similarly to the case in FIG. 5. The quantity of the waste developer accumulated in the collection container 26 increases, and as shown in FIG. 11A, the approximately constant output voltage B is output from the pressure sensor 37 to the central controller 40 until the upper end of the accumulated waste developer 51 reaches the lower end of the filter 31. When the waste developer 51 is accumulated in the collection container 26 and the upper end of the accumulated waste developer 51 exceeds the lower end of the filter 31 as shown in FIG. 11B, the area of the filter 31 for allowing the air to pass becomes gradually small, and the internal pressure of the collection container 26 detected by the pressure sensor 30 becomes gradually high, so that the output voltage from the pressure sensor 30 becomes gradually high as shown in FIG. 5. The output voltage from the pressure sensor 30 increases according to a decrease in the area of the filter 31 for allowing the air to pass until the accumulated quantity of the waste developer 51 collected in the collection container 26 increases and, as shown in FIG. 11C, the upper end of the accumulated waste developer 51 reaches the upper end of the filter 31. When the upper end of the accumulated waste developer 51 reaches the near end line 32 and the filter 31 is completely clogged with the waste developer, the output voltage S is output from the pressure sensor 30 to the central controller 33. When the upper end of the accumulated waste developer 51 reaches the upper end of the filter 31 and the filter 31 is completely clogged, the air in the collection container 26 does not flow to the outside, and the supply quantity of the air flowing from the suction pump 27 to the collection container 26 decreases so that the variation in the internal pressure of the collection container 26 becomes small.

The NVRAM 38 of the central controller 33, consequently, prestores the minimum reference voltage B at which the air is allowed to pass through the entire surface of the filter 31 of the collection container 26, the reference voltage S corresponding to the position of the near end line 32 of the collection container 26, and the reference time T for driving the development motor 29 and the suction pump 27 required until the top surface of the waste developer 51 accumulated in the collection container 26 reaches the near end line 32 and then reaches an upper limit value 52 as shown in FIG. 11D.

When the image formation apparatus 1 forms an image, the voltage comparator 39 of the central processor 33 monitors the voltage output from the pressure sensor 30 of the collection container 26 with certain time intervals, for example, every one second, and compares the voltage with the reference voltage S stored in the NVRAM 38. When the output voltage from the pressure sensor 30 reaches the reference voltage S, the near end flag is raised in the NVRAM 38. When the near end flag is raised in the NVRAM 38, the CPU 36 outputs the signal which shows that the collection container 26 is at the near end to the operation display section 35, so as to instruct the operation display section 35 to display the near end of the collection container 26. In such a manner, the CPU 36 informs the user that the collection container 26 approaches replacement time.

After the CPU 36 outputs the near end signal to the operation display section 35, the CPU 36 drives the time counter 41 every time when the image is formed by the image formation apparatus 1, and it instructs the time counter 41 to integrate the driving time of the development motor 29 and stores the cumulative time of the driving time of the development motor 29 after the near end flag is raised in the NVRAM 38 into the NVRAM 38. Since the cumulative time of the driving time of the development motor 29 is stored in the NVRAM 38 in such a manner, even if the power of the image formation apparatus 1 is turned off, the cumulative time can be saved. When the image is formed by the image formation apparatus 1, the time comparator 42 compares the cumulative time of the driving time of the development motor 29 successively stored in the NVRAM 38 with the reference time T prestored in the NVRAM 38. When the cumulative time of the driving time of the development motor 29 after the near end reaches the reference time T, the collection container replacement flag is raised in the NVRAM 38. When the collection container replacement flag is raised in the NVRAM 38, the CPU 36 stops the image forming operation in the image formation apparatus 1, and instructs the operation display section 35 to display the instruction that indicates that the collection container 26 is full and should be replaced.

The user or the service person who confirms the instruction on the operation display section 35 turns off the power of the image formation apparatus 1 and removes the collection container 26 filled with the waste developer so as to replace it with a new collection container 26. When the old collection container 26 is replaced with the new collection container 26, the handle 46 of the collection container 26 filled with the waste developer is held so as to be taken out of the attachment portion, and the exhaust pipe 47 is removed from the collection container 26. The exhaust pipe 47 is, then, attached to the new collection container 26 and the handle 46 is held so that the exhaust pipe 47 is attached to the attachment portion. The collection container 26 filled with the waste developer can be collected only by taking out the collection container 26 and removing the exhaust pipe 47. The new collection container 26 can be attached to the attachment portion only by mounting the exhaust pipe 47 to the new collection container 26, and the handle 46 of the collection container 26 is held so as to be capable of being attached and detached. Consequently, the collection container 26 can be replaced easily. Since the pressure sensor 30 is not connected directly to the collection container 26, when the collection container 26 is replaced, the pressure sensor 30 can be prevented from being damaged.

When the old collection container 26 is replaced with the new collection container 26 and the power of the image formation apparatus 1 is turned on, the CPU 36 of the central controller 33 instructs the driving controller 43 to temporarily drive the suction pump 27. At this time, the voltage comparator 39 compares the output voltage from the pressure sensor 30 with the minimum reference voltage B stored in the NVRAM 38. When the output voltage from the pressure sensor 30 is within a certain range of the minimum reference voltage B, the judgment is made that the new collection container 26 is attached normally, and the near end flag raised in the NVRAM 38 is cleared. When the near end flag is cleared, the collection container replacement flag is also cleared, so that the prohibition of the image forming operation in the image formation apparatus 1 is lifted. When the output voltage from the pressure sensor 30 is in not more than the certain range of the minimum reference voltage B, the judgment is made that the collection container 26 is not normally attached or the pressure sensor 30 is abnormal.

When such judgment is made, the CPU 36 instructs the operation display section 35 to display the message for urging the check on the state of the development apparatus 13. When the user or the service person checks on the display and on the state of the development apparatus 13 and the state of the development apparatus 13 becomes normal, the prohibition of the image forming operation in the image formation apparatus 1 is lifted.

According to the second embodiment, the collected quantity of the dust such as the waste developer is detected accurately and the suitable replacement time of the collection container is informed, and the collection container can be replaced easily and at a low cost, and development contamination due to abnormal attachment of the collection container can be prevented.

It has been mentioned above that the waste developer from the development unit 25 is collected into the collection container 26. However, it is sufficient that the developer is collected in a container, and it is not important from where the developer is collected. For example, the present invention can be applied to a case in which the waste developer is resulted from cleaning of the surface of the photoreceptor 11 by the cleaning unit 15.

An image formation apparatus according to a third embodiment is quite similar to that in the first and the second embodiments. The difference is that the image formation apparatus according to the third embodiment includes a pressure detector that detects the collected quantity of the waste developer collected into the collection container 26.

FIG. 12 is a partial sectional view of an example of the pressure detector in the third embodiment. A portion of the upper surface of the collection container 26 (or an upper side surface) is provided with an opening (may be used also as an exhaust port of the waste developer), and the opening is formed into a spiral shape. The opening has a plug 53a which is detachable along the spiral, and a bellows portion 53b which stretches to a direction of an outline arrow in the drawing when not less than certain pressure is applied to the inside of the collection container 26. The plug 53a and the bellows portion 53b compose a movable portion which stretches according to the pressure in the collection container 26.

The stretch position of the bellows portion 53b has an actuator 54 which turns about a shaft 54a according to a stretch condition of the bellows as shown by a broken line, and a sensor 55 which detects a tilt of the actuator 54 to a certain position. A non-contact optical sensor (photosensor) is used here, but the sensor 55 is not limited to this example, and various sensors can be used as long as they detect a movement of the actuator 54. The actuator 54 and the sensor 55 compose a detector which detects stretch of the movable portion.

Since the actuator 54 and the sensor 55 are constituted separately from the plug 53a and the bellows portion 53b, even when the plug 53a is removed so that the waste developer is discharged or the plug 53a with the bellows portion 53b is replaced, the sensor 55 and the actuator 54 are not influenced at all.

Since when a pressure lower than or equal to the certain pressure is applied to the inside of the collection container 26, the bellows portion 53b formed above the plug 53a stretches, a thickness of the formed film on the bellows portion and a size of the bellows or a number of the bellows are suitably selected so that the pressure can be adjusted arbitrarily. The certain pressure here means a pressure at which the waste developer collected in the collection container 26 is accumulated to exceed the upper end of the filter 31 and the internal pressure becomes maximum by means of the suction pump 27, the bellows portion 53b starts to stretch. The pressure at which the bellows portion starts to stretch can be, however, set arbitrarily according to applications and conditions of use.

The service person of the image formation apparatus 1 turns the plug 53a with the bellows portion 53b so as to remove it from the collection container 26, and discards the waste developer and again attaches the plug, so that the collection container 26 can be reused easily. Since the bellows portion 53b is a thin mold member, it is easily deformed while it is being used for long time, and thus its suitable operation cannot be ensured. In this case, the plug is replaced with a new one. Since the plug 53a with the bellows portion 53b can be manufactured simply and comparative inexpensively, only the plug 53a can be replaced without exchanging the sensor 55 and the actuator 54. The structure of the plug 53a, consequently, has an advantage that running cost can be also reduced.

The operation is explained below. When the collection container 26 shown in FIG. 12 is attached into the image formation apparatus 1 in FIG. 1, the bellows portion 53b comes below the actuator (sold line position) 54.

When the image formation apparatus 1 is used, the waste developer is accumulated in the collection container 26 and exceeds the near end line 32 (see FIGS. 6A to 6D) at the upper end of the filter 31 arranged on the side surface of the collection container 26. When the internal pressure is heightened so as to become the not less than certain pressure, the bellows portion 53b starts to stretch (the direction of the outline arrow in FIG. 12) and pushes up so as to turn the actuator 54 to a position of a broken line.

Figure 13A:
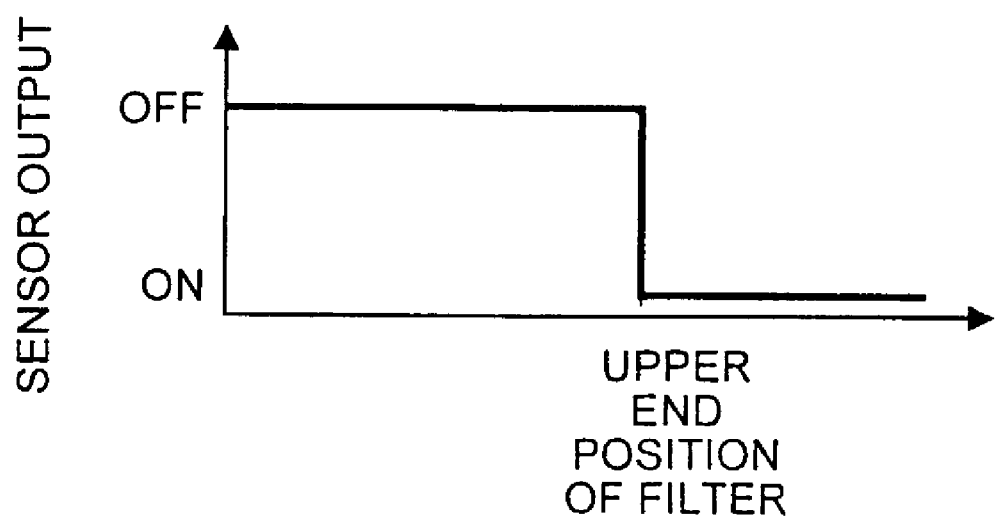
FIGS. 13A and 13B are graphs of sensor output against internal pressure of the collection container.
Figure 13B:
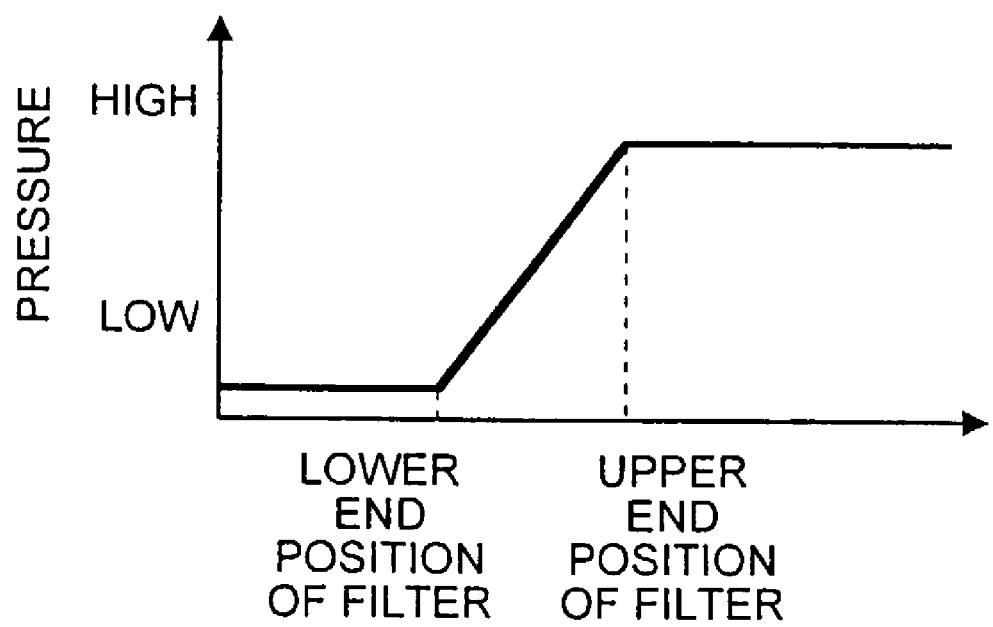

FIGS. 13A and 13B are charts that show a variation in the output from the sensor 55 and a variation in the internal pressure of the collection container 26, respectively. That the sensor 55 detects the actuator 54 means that it indirectly detects that the bellows portion 53b stretches by a certain height. That is to say, this means that the internal pressure of the collection container 26 becomes the not less than certain pressure, and concretely, this suggests that the waste developer exceeds the near end line 32 at the upper end of the filter 31.

This is explained with reference to FIG. 13B. When the accumulated surface of the waste developer is on or below the lower end position of the filter, the air passes through the entire surface of the filter 31, and only the air resistance of the filter 31 is generated, so that the pressure becomes constantly low.

When the accumulated position of the collected waste developer exceeds the lower end position of the filter 31, the area of the filter 31 for allowing the air to pass becomes gradually small, and thus the pressure in the collection container 26 rises gradually.

When the accumulated position exceeds the upper end position of the filter 31, the waste developer completely clogs the filter 31, and thus the air in the collection container 26 does not flow to the outside. As a result, the supply quantity of the air to flow from the suction pump 27 to the collection container 26 reduces, and the internal pressure of the collection container 26 becomes constantly high.

When the high internal pressure is applied to the plug 53a with the bellows portion 53b, the bellows portion 53b stretches so as to drive the actuator 54, and the output from the sensor 55 is ON (see FIG. 13A).

This means that the near end of the waste developer is detected The operation from the detection of the near end to the display of the replacing instruction for the collection container 26 on the operation display section 35 and the operation from the replacement of the collection container 26 to the reset are the same as those in the first and the second embodiments, and thus overlapped explanation thereof is omitted.

According to the third embodiment, the collected quantity of the dust such as the waste developer is detected accurately and the suitable replacement time of the collection container is informed, and the collection container can be replaced easily and at a low cost. The developer pollution due to abnormal attachment of the collection container can be, consequently, prevented.

Moreover, the similar mechanism to the pressure sensor is provided on the side of the collection container inexpensively by using the bellows, and the expensive detection mechanism such as the sensor is arranged outside the collection container. Consequently, the replacement cost of the collection container can be reduced greatly by preventing the sensor from being omitted to be provided and from being damaged.

Furthermore, since the similar mechanism to the pressure sensor is used also as a cover of the discharge port for discarding the waste developer by using the plug with the bellows, reduction in the cost and the replaceability are improved.

According to the first to the third embodiments, since the time is managed after the accurate detection of the near end, even if the accumulated state is changed, an error is less, and thus the use can be continued only for certain time after the near end is displayed. Consequently, the operability can be improved by reducing influence upon the user to the utmost.

The third embodiment explains that the waste developer from the development unit 25 is collected into the collection container 26, but the invention can be applied similarly to the collection container which collects the waste developer resulted from a cleaning of the surface of the photoreceptor 11 by the cleaning unit 15.

As explained above, a first aspect of the present invention provides a dust collection apparatus in which quantity of the dust (i.e., the developer) accumulated can be detected with high precision, in which the developer accumulated can be reused, and that has good operability and serviceability, and which is low cost. It is possible to inform the user of the near end and the full state of the collection container. The dust does not scatter or leak. The collection container can be replaced safely. The collection container be easily detached and replaced. Even if there is a variation in how the dust is collected into the collection container, a sufficient quantity of the dust can be collected.

A second aspect of the present invention provides a development unit in which a developer with small particle diameter can be used.

A third aspect of the present invention provides an image formation apparatus in which quantity of the dust (i.e., the developer) accumulated can be detected with high precision, in which the developer accumulated can be reused, and that has good operability and serviceability, and which is low cost.

A fourth aspect of the present invention provides a dust collection method in which quantity of the dust (i.e., the developer) accumulated can be detected with high precision.

The present document incorporates by reference the entire contents of Japanese priority documents, 2002-175147 filed in Japan on Jun. 17, 2002, 2003-43726 filed in Japan on Feb. 21, 2003 and 2003-130574 filed in Japan on May 8, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A dust collection apparatus comprising:
   a container for dust, the container having a side surface;
   a suction pump that suck the dust and transports the dust into the container;
   a filter provided on the side surface of the container, the filter having a structure so as to pass air but prevent passage of the dust in the container;
   a pressure detector which detects internal pressure of the container, wherein the internal pressure of the container fluctuates due to a variation in an effective area of the filter for allowing the air to pass according to the dust collected and accumulated in the container; and
   a dust accumulating quantity calculator which determines a quantity of the dust in the container based on the pressure detected.

2. The dust collection apparatus according to claim 1, wherein the dust is a developer.

3. The dust collection apparatus according to claim 1, wherein
   the filter is provided so that its upper end coincides with a near end of the container, and
   the dust accumulating quantity calculator estimates the near end of the container when the pressure detected indicates that an entire surface of the filter is clogged with the dust, and estimates that the container is full with the dust after a predetermined time has passed from when the near end is detected.

4. The dust collection apparatus according to claim 3, further comprising a display unit which displays information that indicates that the container is near end when the dust accumulating quantity calculator estimates the near end and displays information that indicates that the container is full when the dust accumulating quantity calculator estimates that the container is full.

5. The dust collection apparatus according to claim 1, wherein if the pressure detected is less than or equal to a predetermined level, the dust accumulating quantity calculator determines any one of that there is a leakage of the dust and that the pressure detector is abnormal.

6. The dust collection apparatus according to claim 1, further comprising:
   an exhaust hose having two ends, one end of the exhaust hose being fit to the suction pump; and
   a T-shaped exhaust pipe having a first end, a second end, and a third end, the first end of the exhaust pipe being fit to other end of the exhaust hose, the second end of the exhaust pipe being fit to an opening in the container, and the third end of the exhaust pipe being fit to the pressure detector,
   wherein the container has the opening, into which the second end of the exhaust pipe is fitted without a gap, on its back surface.

7. The dust collection apparatus according to claim 6, wherein the container has a front surface and a handle on the front surface.

8. The dust collection apparatus according to claim 6, wherein the opening of the container is arranged above an upper end of the filter.

9. The dust collection apparatus according to claim 6, wherein the second end of the exhaust pipe is worked in the form of a wedge.

10. The dust collection apparatus according to claim 6, wherein the container has a back surface, and the dust collection apparatus further comprises an attachment portion where the container is attached; and
a sensor that detects the back surface of the container, and
wherein
the suction pump is driven only when the sensor has detected the back surface of the container.

11. The dust collection apparatus according to claim 1, wherein the pressure detector is a diffusion type semiconductor pressure sensor.

12. The dust collection apparatus according to claim 1, wherein:

the pressure detector includes a movable portion which is provided onto an upper surface of the container and stretches according to the internal pressure of the container, and a detection unit which detects stretch of the movable portion, and
the movable portion is constituted so as to be stretched by pressure in a state in which the filter is entirely clogged with the dust.

13. The dust collection apparatus according to claim 12, wherein the movable portion is provided detachably to the container.

14. A development apparatus comprising:

a container for dust, the container having a side surface;
a suction pump that suck the dust and transports the dust into the container;
a filter provided on the side surface of the container, the filter having a structure so as to pass air but prevent passage of the dust in the container;
a pressure detector which detects internal pressure of the container, wherein the internal pressure of the container fluctuates due to a variation in an effective area of the filter for allowing the air to pass according to the dust collected and accumulated in the container; and
a dust accumulating quantity calculator which determines a quantity of the dust in the container based on the pressure detected.

15. An image formation apparatus comprising:

a container for dust, the container having a side surface;
a suction pump that suck the dust and transports the dust into the container;
a filter provided on the side surface of the container, the filter having a structure so as to pass air but prevent passage of the dust in the container;
a pressure detector which detects internal pressure of the container, wherein the internal pressure of the container fluctuates due to a variation in an effective area of the filter for allowing the air to pass according to the dust collected and accumulated in the container; and
a dust accumulating quantity calculator which determines a quantity of the dust in the container based on the pressure detected.

16. A method of collecting dust, comprising:

sucking and collecting the dust into a container, the container having a side surface on which a filter with a structure that allows to pass air but prevent passage of the dust in the container is provided;
detecting internal pressure of the container, wherein the internal pressure of the container fluctuates due to a variation in an effective area of the filter for allowing the air to pass according to the dust collected and accumulated in the container; and
judging a quantity of the dust in the container based on the pressure detected.

* * * * *